US010969047B1

(12) United States Patent
Crompton et al.

(10) Patent No.: US 10,969,047 B1
(45) Date of Patent: Apr. 6, 2021

(54) ELECTRICAL CONDUIT FITTING AND ASSEMBLY

(71) Applicant: Quick Fitting, Inc., Warwick, RI (US)

(72) Inventors: David B. Crompton, Stonington, CT (US); Libardo Ochoa Dias, West Warwick, RI (US); Herbert J. Bouchard, West Greenwich, RI (US)

(73) Assignee: Quick Fitting Holding Company, LLC, Warwick, RI (US)

( * ) Notice: Subject to any disclaimer, the term of this patent is extended or adjusted under 35 U.S.C. 154(b) by 0 days.

(21) Appl. No.: 16/775,582

(22) Filed: Jan. 29, 2020

(51) Int. Cl.
*F16L 37/091* (2006.01)
*H02G 3/06* (2006.01)
*F16L 19/08* (2006.01)

(52) U.S. Cl.
CPC ......... *F16L 37/0915* (2016.05); *F16L 19/086* (2013.01); *H02G 3/0616* (2013.01)

(58) Field of Classification Search
CPC ............................. F16L 37/091; F16L 37/0915
USPC ....................................................... 285/340
See application file for complete search history.

(56) References Cited

U.S. PATENT DOCUMENTS

| 70,198 | A | 10/1867 | Gray |
|---|---|---|---|
| 1,822,056 | A | 9/1931 | Noble |
| 1,927,390 | A | 9/1933 | Church |
| 2,132,636 | A | 10/1938 | Maahs |
| 2,201,372 | A | 5/1940 | Miller |
| 2,230,098 | A | 1/1941 | Wurzburger |
| 2,316,806 | A | 4/1943 | Parker |
| 2,398,618 | A | 4/1946 | Chavayda |
| 2,450,527 | A | 10/1948 | Smith et al. |
| 2,452,275 | A | 10/1948 | Woodling |
| 2,456,203 | A | 12/1948 | Loepsinger |
| 2,478,149 | A | 8/1949 | Wolfram |
| 2,529,821 | A | 11/1950 | Snider |
| 2,774,616 | A | 12/1956 | Dodd et al. |
| 2,917,075 | A | 12/1959 | Terry |
| 3,060,959 | A | 10/1962 | Clark |
| 3,064,983 | A | 11/1962 | Halterman |
| 3,066,961 | A | 12/1962 | Jacques |

(Continued)

FOREIGN PATENT DOCUMENTS

| CA | 2386574 | 3/2001 |
|---|---|---|
| CN | 102788212 A | 11/2012 |

(Continued)

OTHER PUBLICATIONS

International Search Report and Written Opinion of the International Searching Authority for PCT/US2020/015582, dated May 20, 2020.

*Primary Examiner* — David Bochna
(74) *Attorney, Agent, or Firm* — Williams Mullen; Thomas F. Bergert

(57) ABSTRACT

A push-to-connect electrical conduit fitting and assembly facilitates the connection of multiple types of metallic conduit regardless of connection type and finish. In various embodiments, an axially internal portion of the fitting has an interior surface that tapers from a narrower radius to a wider radius as it extends axially outwardly from a tube stop element. A packing arrangement including a sealing member, fastening ring and release pusher are maintained within axially intermediate and/or outer portions of the fitting to facilitate retention of inserted conduits.

16 Claims, 9 Drawing Sheets

(56) References Cited

U.S. PATENT DOCUMENTS

| | | |
|---|---|---|
| 3,074,747 A | 1/1963 | Boughton |
| 3,140,107 A | 7/1964 | Hynes |
| 3,145,730 A | 8/1964 | Presnell |
| 3,188,122 A | 6/1965 | Smith |
| 3,193,299 A | 7/1965 | Gardner |
| 3,265,412 A | 8/1966 | Reid et al. |
| 3,312,484 A | 4/1967 | Davenport |
| 3,365,219 A | 1/1968 | Nicolaus |
| 3,428,337 A | 2/1969 | Read |
| 3,434,745 A | 3/1969 | Jackman |
| 3,498,647 A | 3/1970 | Schroder |
| 3,632,141 A | 1/1972 | Larsson |
| 3,633,944 A | 1/1972 | Hamburg |
| 3,659,881 A | 5/1972 | Tinsley et al. |
| 3,679,241 A | 7/1972 | Hoffmann |
| 3,709,526 A | 1/1973 | Cromie |
| 3,805,824 A | 4/1974 | Robbins |
| 3,821,670 A | 6/1974 | Thompson |
| 3,837,687 A | 9/1974 | Leonard |
| 3,885,821 A | 5/1975 | Philibert |
| 3,915,480 A | 10/1975 | Kish et al. |
| 3,986,730 A | 10/1976 | Martelli et al. |
| 4,000,919 A | 1/1977 | Edwards et al. |
| 4,009,592 A | 3/1977 | Boerger |
| 4,037,864 A | 7/1977 | Anderson et al. |
| 4,067,361 A | 1/1978 | Holloster et al. |
| 4,083,586 A | 4/1978 | Helm |
| 4,107,452 A | 8/1978 | Razvi |
| 4,123,090 A | 10/1978 | Kotsakis et al. |
| 4,135,745 A | 1/1979 | Dehar |
| 4,146,254 A | 3/1979 | Turner et al. |
| 4,178,023 A | 12/1979 | Guest |
| 4,220,361 A | 9/1980 | Brandenberg |
| 4,275,909 A | 6/1981 | Yoshizawa et al. |
| 4,288,113 A | 9/1981 | Saulnier |
| 4,305,606 A | 12/1981 | Legris |
| 4,372,586 A | 2/1983 | Rosenberg |
| 4,372,905 A | 2/1983 | Bohman |
| 4,383,552 A | 5/1983 | Baker |
| 4,437,493 A | 3/1984 | Okuda et al. |
| 4,440,424 A | 4/1984 | Mode |
| 4,466,640 A | 8/1984 | Van Houtte |
| 4,480,729 A | 11/1984 | Porter |
| 4,497,511 A | 2/1985 | Barker |
| 4,508,369 A | 4/1985 | Mode |
| 4,591,192 A | 5/1986 | Van Excel et al. |
| 4,593,943 A | 6/1986 | Hama et al. |
| 4,606,565 A | 8/1986 | Royston |
| 4,613,172 A | 9/1986 | Schattmaier |
| 4,627,644 A | 12/1986 | Ekman |
| 4,630,848 A | 12/1986 | Twist |
| 4,637,636 A | 1/1987 | Guest |
| 4,637,640 A | 1/1987 | Fournier et al. |
| 4,645,246 A | 2/1987 | Guest |
| 4,685,706 A | 8/1987 | Kowal et al. |
| 4,712,810 A | 12/1987 | Pozzi |
| 4,747,626 A | 5/1988 | Hama et al. |
| 4,801,158 A | 1/1989 | Gomi |
| 4,802,696 A | 2/1989 | Chohan et al. |
| 4,867,198 A | 9/1989 | Faust |
| 4,878,697 A | 11/1989 | Henry |
| 4,880,260 A | 11/1989 | Gotoh et al. |
| 4,895,395 A | 1/1990 | Ceriani |
| 4,919,457 A | 4/1990 | Moretti |
| 4,997,214 A | 3/1991 | Reese |
| 5,010,740 A | 4/1991 | Backus et al. |
| 5,024,468 A | 6/1991 | Burge |
| 5,052,721 A | 10/1991 | Gorman |
| 5,084,954 A | 2/1992 | Klinger |
| 5,108,134 A | 4/1992 | Irwin |
| 5,160,179 A | 11/1992 | Takagi |
| 5,181,751 A | 1/1993 | Kitamura |
| 5,230,539 A | 7/1993 | Olson |
| 5,251,655 A | 10/1993 | Low |
| 5,284,582 A | 2/1994 | Yang |
| 5,292,157 A | 3/1994 | Rubichon |
| 5,370,423 A | 12/1994 | Guest |
| 5,425,347 A | 6/1995 | Zinke, II |
| 5,443,289 A | 8/1995 | Guest |
| 5,487,572 A | 1/1996 | Combot-Courrau et al. |
| 5,511,831 A | 4/1996 | Barton |
| 5,524,936 A | 6/1996 | Barr et al. |
| 5,577,530 A | 11/1996 | Condon |
| 5,588,681 A | 12/1996 | Parks |
| 5,603,532 A | 2/1997 | Guest |
| 5,711,550 A | 1/1998 | Brandt |
| 5,722,696 A | 3/1998 | Taneya |
| 5,769,462 A | 6/1998 | Angell |
| 5,887,911 A | 3/1999 | Kargula |
| 5,911,443 A | 6/1999 | Le Quere |
| 5,957,509 A | 9/1999 | Komolrochanaporn |
| 5,983,917 A | 11/1999 | Thomas |
| 5,988,690 A | 11/1999 | Bogard |
| 5,996,632 A | 12/1999 | Vogel et al. |
| 6,012,743 A | 1/2000 | Godeau |
| 6,145,887 A | 11/2000 | Combot-Courrau |
| 6,145,893 A | 11/2000 | Kuo |
| 6,174,002 B1 | 1/2001 | Rho |
| 6,264,250 B1 | 7/2001 | Teraoka et al. |
| 6,343,814 B1 | 2/2002 | Bucher et al. |
| 6,352,439 B1 | 3/2002 | Stark et al. |
| 6,357,802 B1 | 3/2002 | Nozato et al. |
| 6,427,309 B1 | 8/2002 | Viegener |
| 6,447,109 B1 | 9/2002 | Williamson et al. |
| 6,502,866 B1 | 1/2003 | Hujisawa et al. |
| 6,517,124 B1 | 2/2003 | Le Quere |
| 6,536,470 B1 | 3/2003 | Carn et al. |
| 6,578,879 B2 | 6/2003 | Muto |
| 6,583,815 B1 | 6/2003 | Driscoll et al. |
| 6,612,623 B2 | 9/2003 | Salomon-Bahls |
| 6,634,074 B2 | 10/2003 | Wild |
| 6,663,145 B1 | 12/2003 | Lyall, III et al. |
| 6,685,230 B1 | 2/2004 | Bottura |
| 6,764,102 B2 | 7/2004 | Ezura |
| 6,795,113 B1 | 9/2004 | Jackson et al. |
| 6,805,385 B2 | 10/2004 | Viegener |
| 6,824,172 B1 * | 11/2004 | Komolrochanaporn ............ F16L 37/0925 285/340 |
| 6,843,516 B2 | 1/2005 | Bishop et al. |
| 6,851,728 B2 | 2/2005 | Minami |
| 6,869,109 B2 | 3/2005 | Matsushita |
| 6,871,804 B2 | 3/2005 | Hagihara |
| 6,954,310 B2 | 10/2005 | Holloway et al. |
| 6,979,026 B2 | 12/2005 | Kasahara et al. |
| 6,988,509 B2 | 1/2006 | Frampton et al. |
| 6,988,746 B2 | 1/2006 | Olson |
| 7,025,392 B2 | 4/2006 | Inoue et al. |
| 7,100,948 B2 | 9/2006 | Guest |
| 7,178,836 B2 | 2/2007 | Hoff et al. |
| 7,195,287 B2 | 3/2007 | Wai |
| 7,273,235 B2 | 9/2007 | Coquard et al. |
| 7,316,429 B2 | 1/2008 | Viegener |
| 7,350,831 B2 | 4/2008 | Shimizu |
| 7,380,836 B2 | 6/2008 | Bogdanowicz et al. |
| 7,445,247 B2 | 11/2008 | Ericksen et al. |
| 7,448,654 B2 | 11/2008 | Le Quere |
| 7,475,913 B2 | 1/2009 | Muto |
| 7,509,971 B2 | 3/2009 | Kajuch |
| 7,530,606 B1 | 5/2009 | Yang |
| 7,549,679 B2 | 6/2009 | Brosius et al. |
| 7,621,569 B2 | 11/2009 | Anthoine |
| 7,644,955 B1 | 1/2010 | Komolrochanaporn |
| 7,646,404 B2 | 1/2010 | Liu et al. |
| 7,686,346 B1 | 3/2010 | Buccicone et al. |
| 7,823,932 B2 | 11/2010 | Webb et al. |
| 7,850,208 B2 | 12/2010 | Greenberger |
| 7,862,089 B2 | 1/2011 | Crompton |
| 7,878,555 B2 | 2/2011 | Oh |
| 7,914,050 B2 | 3/2011 | Udhofer et al. |
| 7,942,161 B2 | 5/2011 | Crompton |
| 7,954,861 B2 | 6/2011 | Swift et al. |
| 8,118,331 B2 | 2/2012 | Yamashita et al. |
| RE43,490 E | 6/2012 | Gullichsen et al. |

(56) References Cited

U.S. PATENT DOCUMENTS

| | | | |
|---|---|---|---|
| 8,205,915 B1* | 6/2012 | Crompton | F16L 37/0915 285/340 |
| 8,210,576 B2 | 7/2012 | Crompton | |
| 8,272,671 B2 | 9/2012 | Becker et al. | |
| 8,322,755 B2 | 12/2012 | Kluss et al. | |
| 8,398,122 B2 | 3/2013 | Crompton et al. | |
| 8,439,404 B2 | 5/2013 | Anton et al. | |
| 8,480,134 B2* | 7/2013 | Crompton | F16L 37/0915 285/340 |
| 8,491,012 B2 | 7/2013 | LeQuere | |
| 8,517,431 B2 | 8/2013 | Arning et al. | |
| 8,585,100 B2* | 11/2013 | Stults | F16L 13/142 285/382 |
| 8,701,715 B1 | 4/2014 | Crompton et al. | |
| 8,730,299 B1 | 5/2014 | Kozko | |
| 8,764,066 B1 | 7/2014 | Rice et al. | |
| 8,818,101 B1 | 8/2014 | Lim | |
| 8,844,974 B1 | 9/2014 | Crompton et al. | |
| 8,844,981 B1 | 9/2014 | Crompton et al. | |
| 8,888,145 B1 | 11/2014 | Crompton et al. | |
| 9,055,220 B1 | 6/2015 | Kozko | |
| 9,068,680 B1 | 6/2015 | Crompton et al. | |
| 9,086,179 B1 | 7/2015 | Komolrochanaporn | |
| 9,152,019 B2 | 10/2015 | Kintner | |
| 9,217,529 B2 | 12/2015 | Crompton et al. | |
| 9,416,897 B2 | 8/2016 | Crompton et al. | |
| 9,521,321 B1 | 12/2016 | Kozko | |
| 9,791,078 B2* | 10/2017 | Lee | F16L 37/091 |
| 9,822,912 B2* | 11/2017 | Crompton | F16L 37/0915 |
| 9,879,810 B2* | 1/2018 | Crompton | F16L 37/0915 |
| 9,903,516 B2* | 2/2018 | Salehi-Bakhtiari | F16L 37/091 |
| 9,920,866 B2 | 3/2018 | Crompton et al. | |
| 10,180,202 B2 | 1/2019 | Crompton et al. | |
| 10,374,333 B2 | 8/2019 | Le Quere | |
| 10,400,929 B2 | 9/2019 | Crompton et al. | |
| 2002/0163195 A1 | 11/2002 | Vitel et al. | |
| 2003/0020279 A1 | 1/2003 | Houtschilt et al. | |
| 2003/0057701 A1 | 3/2003 | Koo | |
| 2003/0067170 A1 | 4/2003 | Snyder et al. | |
| 2003/0071460 A1 | 4/2003 | Synder et al. | |
| 2004/0061787 A1 | 4/2004 | Liu et al. | |
| 2004/0070195 A1 | 4/2004 | Rohrig | |
| 2004/0183302 A1* | 9/2004 | Allen | F16L 37/091 285/322 |
| 2004/0239115 A1 | 12/2004 | Wilk et al. | |
| 2004/0245766 A1 | 12/2004 | Vallee | |
| 2004/0255608 A1 | 12/2004 | Hector et al. | |
| 2005/0058360 A1 | 3/2005 | Berkey et al. | |
| 2005/0194785 A1 | 9/2005 | Shemtov | |
| 2005/0225087 A1 | 10/2005 | McMahon et al. | |
| 2006/0056056 A1 | 3/2006 | Ahiska et al. | |
| 2006/0163870 A1 | 7/2006 | Goilot | |
| 2006/0202478 A1 | 9/2006 | Guest | |
| 2007/0075542 A1 | 4/2007 | Glaze et al. | |
| 2007/0236595 A1 | 10/2007 | Pan et al. | |
| 2008/0024594 A1 | 1/2008 | Ritchey | |
| 2008/0143103 A1 | 6/2008 | Kiely | |
| 2008/0309081 A1 | 12/2008 | De Wilde | |
| 2009/0002797 A1 | 1/2009 | Kwong et al. | |
| 2009/0021001 A1 | 1/2009 | Oh | |
| 2009/0273130 A1 | 11/2009 | Armstrong et al. | |
| 2009/0278346 A1 | 11/2009 | O'Brien | |
| 2009/0278347 A1 | 11/2009 | Kerin et al. | |
| 2010/0002071 A1 | 1/2010 | Ahiska | |
| 2010/0033551 A1 | 2/2010 | Agarwala et al. | |
| 2010/0045773 A1 | 2/2010 | Ritchey | |
| 2010/0097442 A1 | 2/2010 | Lablans | |
| 2010/0119172 A1 | 5/2010 | Yu et al. | |
| 2010/0253064 A1 | 10/2010 | Le Quere | |
| 2011/0002544 A1 | 1/2011 | Oshima | |
| 2011/0032368 A1 | 2/2011 | Pelling | |
| 2011/0049875 A1 | 3/2011 | Stults et al. | |
| 2011/0101685 A1 | 5/2011 | Lai | |
| 2011/0211040 A1 | 9/2011 | Lindemann et al. | |
| 2012/0001414 A1 | 1/2012 | Arning et al. | |
| 2012/0044391 A1 | 2/2012 | Ni et al. | |
| 2012/0169039 A1 | 7/2012 | Crompton et al. | |
| 2012/0169842 A1 | 7/2012 | Chuang et al. | |
| 2012/0200081 A1 | 8/2012 | Reznar et al. | |
| 2012/0242788 A1 | 9/2012 | Chuang et al. | |
| 2012/0257008 A1 | 10/2012 | Taylor | |
| 2012/0273709 A1 | 11/2012 | Zhang | |
| 2012/0284994 A1 | 11/2012 | Crompton et al. | |
| 2013/0168959 A1 | 7/2013 | Turk | |
| 2013/0241198 A1 | 9/2013 | Eaton et al. | |
| 2013/0258044 A1 | 10/2013 | Betts-Lacroix | |
| 2013/0278715 A1 | 10/2013 | Nutsch et al. | |
| 2013/0321569 A1 | 12/2013 | Agarwala et al. | |
| 2013/0329002 A1 | 12/2013 | Tico | |
| 2014/0002588 A1 | 1/2014 | Ahiska | |
| 2014/0021717 A1 | 1/2014 | Burke et al. | |
| 2014/0049609 A1 | 2/2014 | Wilson et al. | |
| 2014/0062078 A1 | 3/2014 | Weissmann | |
| 2014/0210940 A1 | 7/2014 | Barnes | |
| 2014/0265321 A1 | 9/2014 | DeCesare et al. | |
| 2014/0267586 A1 | 9/2014 | Aguilar et al. | |
| 2014/0267596 A1 | 9/2014 | Geerds | |
| 2014/0313377 A1 | 10/2014 | Hampton | |
| 2015/0103197 A1 | 4/2015 | Djordjevic et al. | |
| 2015/0137515 A1 | 5/2015 | Ratschmann et al. | |
| 2015/0155654 A1 | 6/2015 | Ferry | |
| 2015/0189140 A1 | 7/2015 | Sutton et al. | |
| 2015/0212653 A1 | 7/2015 | Cable et al. | |
| 2015/0244930 A1 | 8/2015 | Ettinger et al. | |
| 2015/0323112 A1 | 11/2015 | Wright | |
| 2015/0345663 A1 | 12/2015 | Jiang et al. | |
| 2015/0345683 A1 | 12/2015 | Crompton et al. | |
| 2015/0358539 A1 | 12/2015 | Catt | |
| 2015/0373279 A1 | 12/2015 | Osborne et al. | |
| 2016/0018030 A1 | 1/2016 | Arstein et al. | |
| 2016/0033065 A1 | 2/2016 | Graham et al. | |
| 2016/0073104 A1 | 3/2016 | Hillebrand et al. | |
| 2016/0088280 A1 | 3/2016 | Sadi et al. | |
| 2016/0131289 A1 | 5/2016 | Spears et al. | |
| 2016/0161038 A1 | 6/2016 | Crompton et al. | |
| 2016/0198087 A1 | 7/2016 | Georgiev et al. | |
| 2016/0219217 A1 | 7/2016 | Williams et al. | |
| 2016/0290538 A1 | 10/2016 | Kawanishi | |
| 2016/0360104 A1 | 12/2016 | Zhang et al. | |
| 2017/0126971 A1 | 5/2017 | Evans et al. | |
| 2017/0163889 A1 | 6/2017 | Evans et al. | |
| 2017/0205003 A1 | 7/2017 | Crompton et al. | |
| 2019/0093807 A1* | 3/2019 | Crompton | F16L 37/091 |

FOREIGN PATENT DOCUMENTS

| | | | |
|---|---|---|---|
| CN | 104154363 | 11/2014 | |
| DE | 4304241 | 8/1994 | |
| EP | 0272988 | 6/1988 | |
| EP | 0610538 | 8/1994 | |
| EP | 1004805 | 5/2000 | |
| EP | 1521027 | 4/2005 | |
| EP | 1564473 | 8/2005 | |
| EP | 2133612 | 12/2009 | |
| EP | 2256394 | 12/2010 | |
| EP | 2511583 | 10/2012 | |
| GB | 2146400 | 4/1985 | |
| GB | 2328259 | 8/2002 | |
| JP | 2001032984 | 2/2001 | |
| KR | 20100083946 A * | 7/2010 | F16L 37/091 |
| WO | 1999039124 | 8/1999 | |
| WO | 2000079173 | 12/2000 | |
| WO | 2013056273 | 4/2013 | |
| WO | 2014106296 | 7/2014 | |

* cited by examiner

Fig. 6
Fig. 7
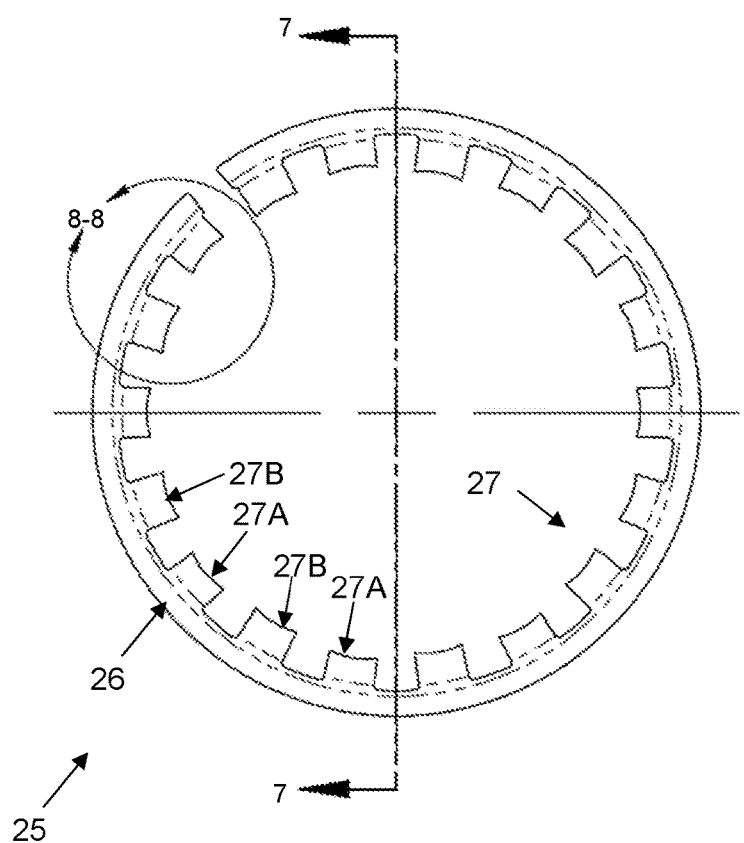
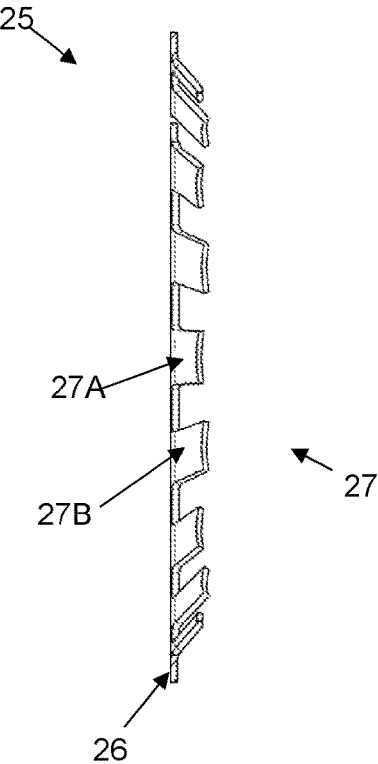
Fig. 8
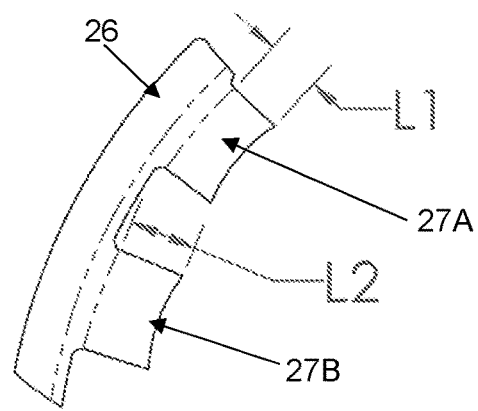

ELECTRICAL CONDUIT FITTING AND ASSEMBLY

TECHNICAL FIELD

The present disclosure relates to conduit systems, and more particularly to an electrical conduit fitting and assembly that facilitates connection to multiple types of metallic conduits.

BACKGROUND

Wiring, cable and other elongated elements require proper protection from weather, sharp objects and other external sources of potential damage. Conduits can be made of metal (e.g., RMC, IMC), rigid or flexible plastic (e.g., PVC) and other materials, and wiring or cabling can vary from very thin wires that may be bundled for passage through a conduit to very thick cables that may not be joined to any other wires or cabling when passed through a conduit. For purposes of the present disclosure, the term "cable" or "cabling" may be used throughout the present disclosure to refer to any type of wire, cable or similar elongated element that can be inserted and pulled through a conduit.

Rigid metal conduit (RMC) and intermediate metal conduit (IMC) are forms of metal conduit designed to handle indoor, outdoor and underground environments with strong connections which have conventionally been threaded to join the conduit. Applications can include residential and commercial applications, including service masts, panel connections and other outdoor applications. RMC is generally thicker and heavier than IMC, although IMC is generally considered to be nearly as strong as RMC. RMC may be manufactured with inside diameters ranging from 0.5 inches to six inches, whereas IMC may be manufactured with inside diameters ranging from 0.5 inches to four inches. RMC and IMC are generally formed of steel and may be galvanized depending upon the application. Further, the axial ends of RMC and IMC conduits may be finished and/or formed with a thread or without a thread (i.e., "plain" or "unthreaded").

Unfortunately, conventional installation and/or attachment of RMC and IMC conduit with couplings and fittings generally requires threading, large pliers, pipe wrenches and specialized fittings. RMC and IMC are generally provided with the same thread and can use the same couplings and fittings when connected by threading. In some environments, compression couplings with external locknuts and threads are employed to secure a conduit without threads to a coupling or fitting. Nevertheless, regardless of connection type, it is often the case that IMC fittings and couplings are not interchangeable with RMC fittings and couplings. For instance, an RMC fitting or coupling may be designed for an RMC conduit having a slightly larger diameter than an IMC conduit.

SUMMARY OF DISCLOSURE

The present disclosure provides, in part, an electrical conduit fitting and assembly that facilitates the connection of multiple types of metallic conduit regardless of connection type and finish.

In various embodiments, the device employs a fitting body, a fastening ring and a release pusher. The fastening ring can be provided with staggered teeth or ribbed teeth. In various embodiments, a sealing ring member is also provided to facilitate applications requiring a waterproof connection. The fastening ring and optional sealing ring can be secured within the fitting body to facilitate the push-to-connect installation of a metal conduit into the fitting. In various embodiments, a release pusher is partially secured within the fitting body and a metal conduit to be attached is inserted through the cavities in the release pusher, fastening ring and optional sealing ring during installation. By employing staggered or ribbed teeth, the fastening ring can accommodate RMC and IMC conduit of slightly different diameter without changing parts. Further, the fitting body interior is formed so as to accommodate inserted conduit members of different diameters and finishes. In various embodiments, a release tool is provided to engage the release pusher to permit the inserted conduit to be disconnected from the fitting body.

BRIEF DESCRIPTION OF THE DRAWINGS

FIG. 6 is a front view of a fastening ring in accordance with embodiments of the present disclosure.

FIG. 7 is a cross-sectional view of the fastening ring taken along line 7-7 of FIG. 6.

FIG. 8 is an enlarged view of encircled portion 8-8 of FIG. 6.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

For purposes of the present disclosure, the term "tube", "pipe", "piping", "conduit", "conduit element" or "piping element" will be understood to encompass one or more pipes, tubes, conduits, piping elements and/or tubing elements, and may be used interchangeably. Further, for purposes of the present disclosure, a fitting can encompass a valve member and other piping elements including, but not limited to: a coupling joint, an elbow joint, a tee joint, a stop end, a ball valve member, tubing and other objects having substantially cylindrical openings. Further, for purposes of the present disclosure, a fitting (also referred to as a body member or main body component) can encompass a valve member and other piping elements including, but not limited to: a coupling joint, an elbow joint, a tee joint, a stop end, a ball valve member, tubing and other objects having cylindrical openings. In various embodiments, the fitting includes an axially inner portion having an interior radius that increases from a tube stop to an axially outer rim of the axially inner portion. In various embodiments, a sealing ring (e.g., O-ring) fits within a first sealing ring compartment defined in the interior surface of the fitting. The fitting interior is formed to provide integrated support for the sealing member and fastening ring when opposing force is applied to piping elements that have been inserted into the fitting. In various embodiments, a release pusher facilitates connection and disconnection of piping elements. Other methods, devices and arrangements associated with the present disclosure are described herein.

It will be appreciated that reference to "a", "an" or other indefinite article in the present disclosure encompasses one or more than one of the described element. Thus, for example, reference to a sealing ring may encompass one or more sealing rings, and so forth.

Figure 1:
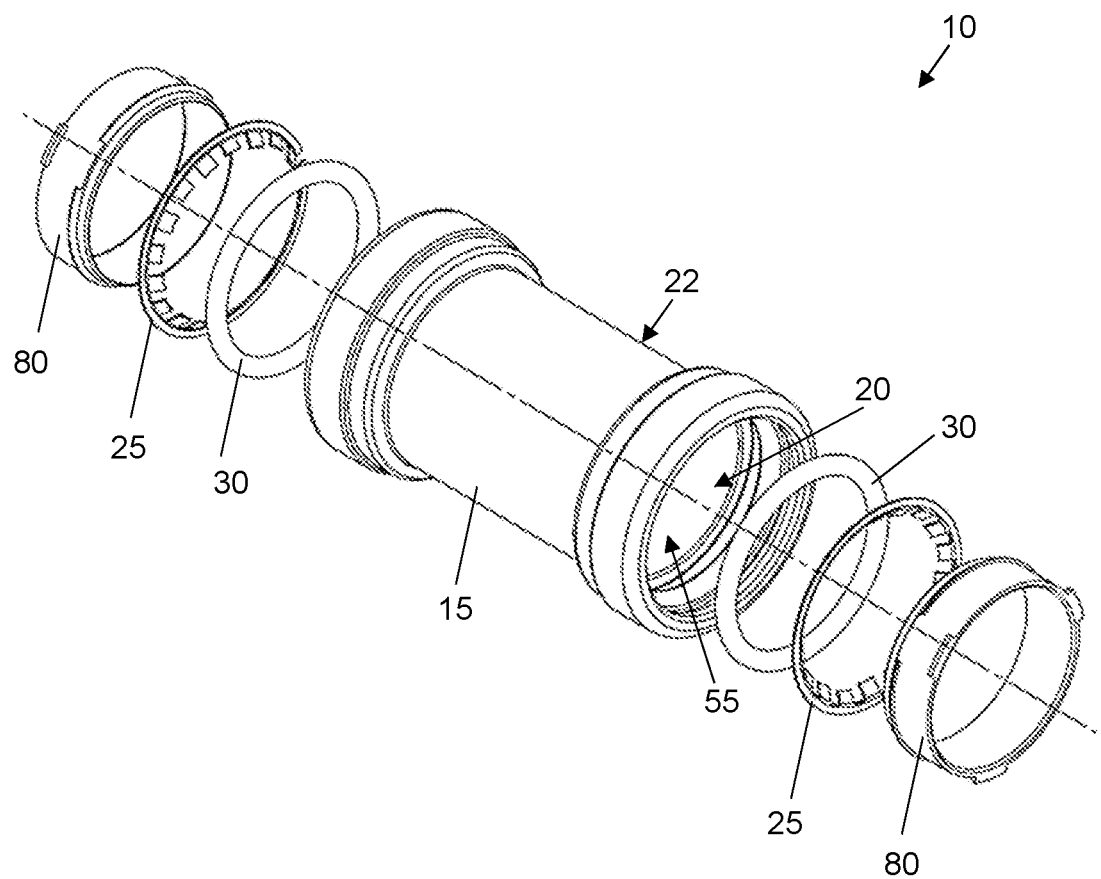
FIG. 1 is an exploded perspective view of an electrical conduit fitting in accordance with embodiments of the present disclosure.

In the push-to-connect fitting assembly 10 according to embodiments of the present disclosure as shown in FIGS. 1 through 21, elements of the assembly as shown include: a fitting (i.e., fitting body or main body component) 15 having an interior surface 20 and exterior surface 22, a grip or fastening ring 25, a release pusher 80 and a sealing member 30, which can optionally be lubricated. In various embodiments, the fitting interior surface 20 is formed via forging and/or machining and is not coined. The fastening ring 25, release pusher 80 and sealing member 30, together or a subset thereof, provide embodiments of a packing arrangement 33 disclosed herein, and each has an internal diameter that allows for smooth and snug engagement of an external surface 92 of a piping or tubing element 90 (shown in FIGS. 17 through 21) when inserted into the opening 55 (shown in FIGS. 1 through 3), which is defined by the fitting interior surface 20 and extends axially therethrough along axis 24.

In various embodiments, the interior diameters of the fastening ring 25 (as measured to the teeth 27 and not the ring cylindrical base 26) and sealing member 30 are substantially the same. Further, the interior diameters of the fastening ring 25 and sealing member 30 are slightly less than that of the fitting 15 and the release pusher 80 so as to facilitate proper operation of the presently disclosed device and arrangement. It will be appreciated that the release pusher 80 can be provided as part of the packing arrangement 33 to facilitate the release of tubing, piping and other cylindrical objects (e.g., 90 in FIG. 17) inserted into the fitting 15. As discussed elsewhere herein and with reference to FIGS. 17 through 21, when it is desired to release an inserted pipe, for example, from the fitting, the release pusher 80 can be forced in the direction of the fastening ring 25 such that its angular surfaces depress the fastening ring teeth 27 off of the surface 92 of the inserted pipe 90, thereby allowing the pipe to be removed.

Figure 2:
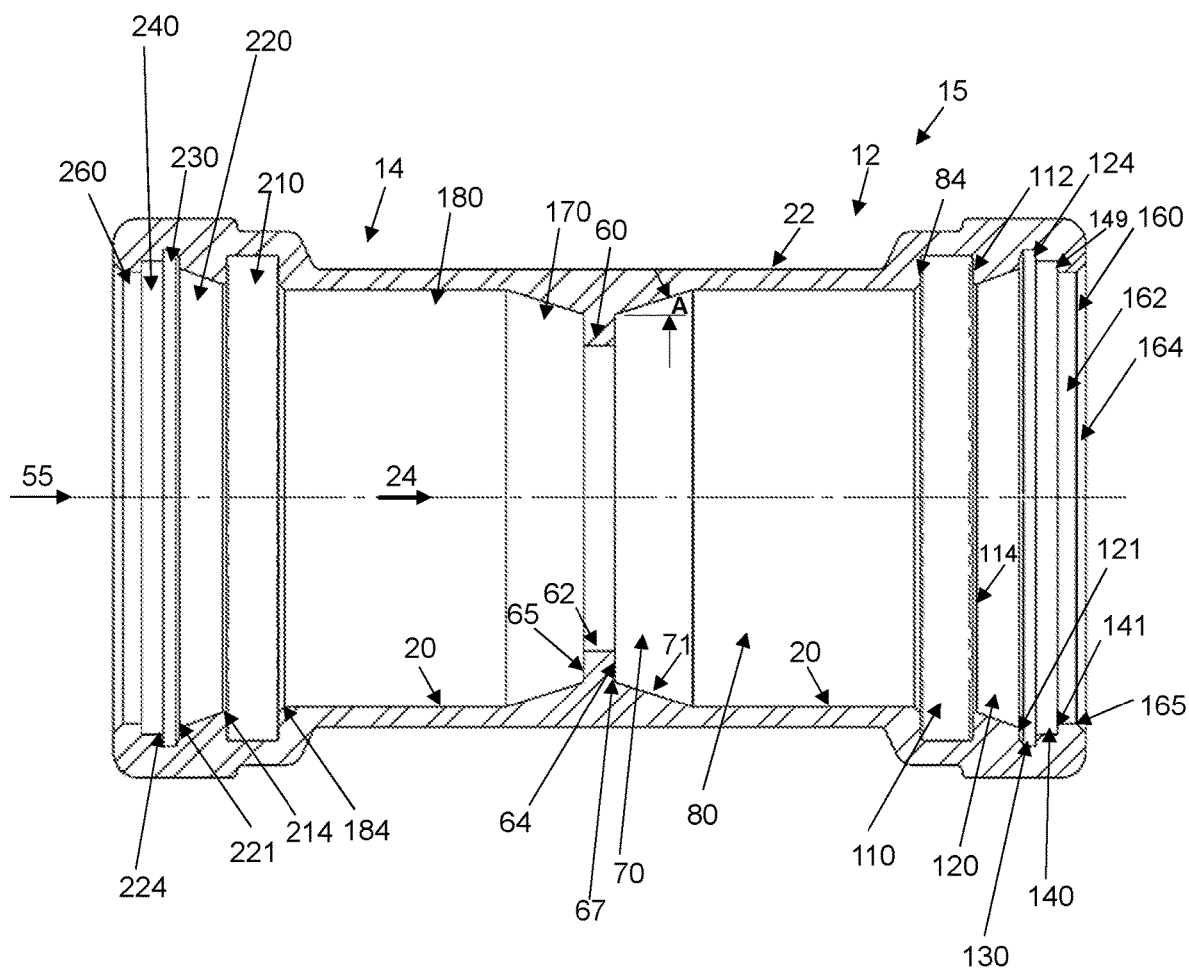
FIG. 2 is a front cross-sectional view of an electrical conduit fitting in accordance with embodiments of the present disclosure.

As further shown in FIGS. 1 through 3 and 17 through 21, the fitting 15 includes first 12 and second 14 segments, divided by a tube stop 60. The fitting 15 can be formed as a monolithic, single body element, wherein the first 12 and second segments 14 and the tube stop 60 are part of the unitary, monolithic, single body 15. The tube stop 60 extends radially inwardly of the inner surface 20 in order to provide a stopping surface for inserted tubes and pipes. In various embodiments, the tube stop 60 comprises a radially innermost and axially extending wall 62, a first segment radially extending wall 64 and a second segment radially extending wall 65. The first segment radially extending wall 64 can comprise a first segment edge 67, wherein the edge 67 lies radially outwardly of the axially extending wall 64 and radially inwardly of a first axially inner portion 70 of the interior surface 20 of the first segment 12. In various embodiments, such as shown in FIG. 2, the axially inner portion 70 extends axially and radially outwardly from the first segment edge 67. Further, the axially inner portion 70 can extend axially and radially outwardly from the first segment edge 67 at a constant angle A to a first axially intermediate portion 80. In various embodiments, angle A can range from approximately 0.5 degrees to approximately thirty-five degrees. The higher angle for angle A may be required when the overall length of the fitting may need to be shorter to accommodate a given application. Conversely, angle A may be lower when the length of the fitting is longer. Further, by employing angles within the ranges described, the device ensures adequate contact with the inserted pipe for grounding, as necessary, while also ensuring the ability to maintain a push-connect operation with the fitting packing arrangement and ensuring that the inserted piping element cannot be rotated when fully inserted. Thus, the tapered interior as described herein facilitates several important purposes.

As further shown in FIG. 2, the fitting first segment 12 can include the axially inner portion 70, first axially intermediate portion 80 extending axially outwardly from the axially inner portion 70 to a radially extending ledge 84, a second axially intermediate portion 110 extending axially outwardly from the radially extending ledge 84 to a radially inwardly extending support 112, wherein the radially extending support comprises a support edge 114, a third axially intermediate portion 120 extending axially and radially outwardly from the support edge 114 to a radially outwardly extending rampart 121, and a fourth axially intermediate portion 130 extending axially outwardly from the rampart 121 to a radially inwardly extending step 124. In various embodiments, the interior surface 20 of the first segment 12 further includes a fifth axially intermediate portion 140 extending axially outwardly from the radially inwardly extending step 124 to a radially inwardly extending lip 141, and an axially outer portion 160 of the first segment 12 extends axially outwardly from the radially inwardly extending lip 141.

It will be appreciated that the second segment 14 of the fitting 15 can be a mirror image of the first segment 12. As such, and as shown in FIG. 2, the fitting second segment 14 can include an axially inner portion 170, a first axially intermediate portion 180 extending axially outwardly from the axially inner portion 170 to a radially extending ledge 184, a second axially intermediate portion 210 extending axially outwardly from the radially extending ledge 184 to a radially inwardly extending support 212, wherein the radially extending support comprises a support edge 214, a third axially intermediate portion 220 extending axially and radially outwardly from the support edge 214 to a radially outwardly extending rampart 221, and a fourth axially intermediate portion 230 extending axially outwardly from the rampart 221 to a radially inwardly extending step 224. In various embodiments, the first segment 212 further includes a fifth axially intermediate portion 240 extending axially outwardly from the radially inwardly extending step 224 to a radially inwardly extending lip 241, and an axially outer portion 260 of the first segment 212 extends axially outwardly from the radially inwardly extending lip 241.

In various embodiments, and with reference to the first segment 12 of FIG. 2, the axially outer portion 160 includes an axially inward portion 162 and an axially outward portion 164, wherein the axially inward portion 162 extends axially outwardly from the radially inwardly extending lip 241 to an axially outer portion edge 165, and wherein the axially outward portion 164 extends axially and radially outwardly from the axially outer portion edge 165. In this way, the axially outward portion 164 provides a tapered entry area for a tube to be inserted, which allows for modest alignment adjustments during operation without requiring an exact axial alignment in order to insert the tube. While not labeled in FIG. 2, the second segment 14 of the fitting 15 can include a similar arrangement for axially outer portion 260. When installed, the outer surface 81 of the release pusher 80 slidingly engages the axially inward portion 162 of the axially outer portion 160 of the fitting interior surface 20.

It will be appreciated that the axially inner portions, axially outer portions and axially intermediate portions can be forged as part of the monolithic, single body of the fitting 15. Further, it will be appreciated that the arrangement of such portions assist with properly maintaining the packing arrangement 33 for optimal operation when tubes are inserted and removed from the fitting 15.

Figure 17:
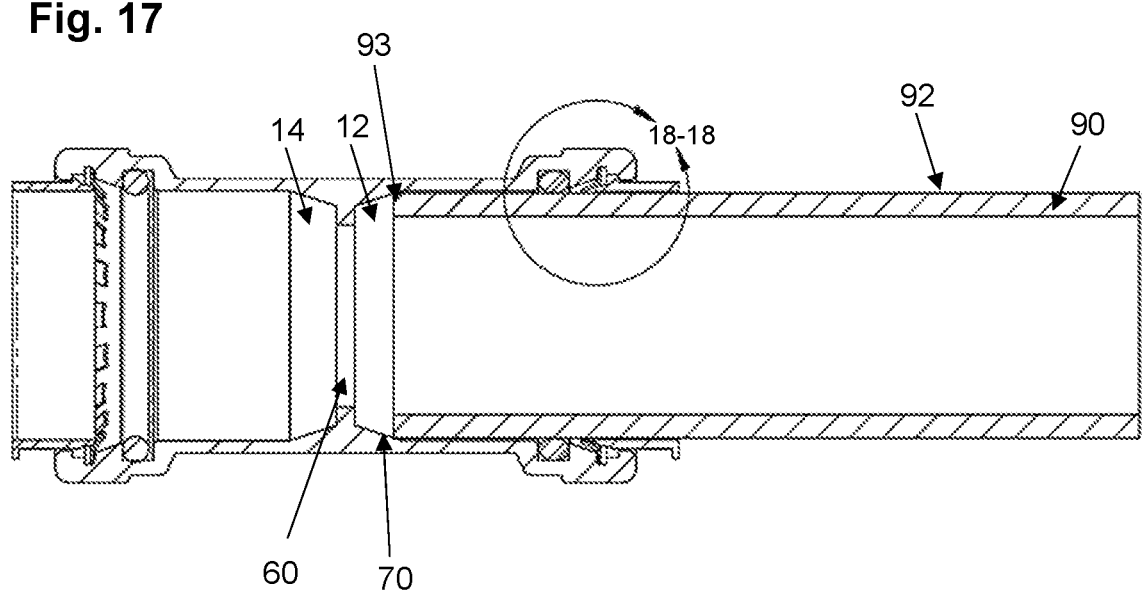
FIG. 17 is a front cross-sectional view of an electrical conduit fitting assembly and showing a conduit inserted in accordance with embodiments of the present disclosure.
Figure 18:
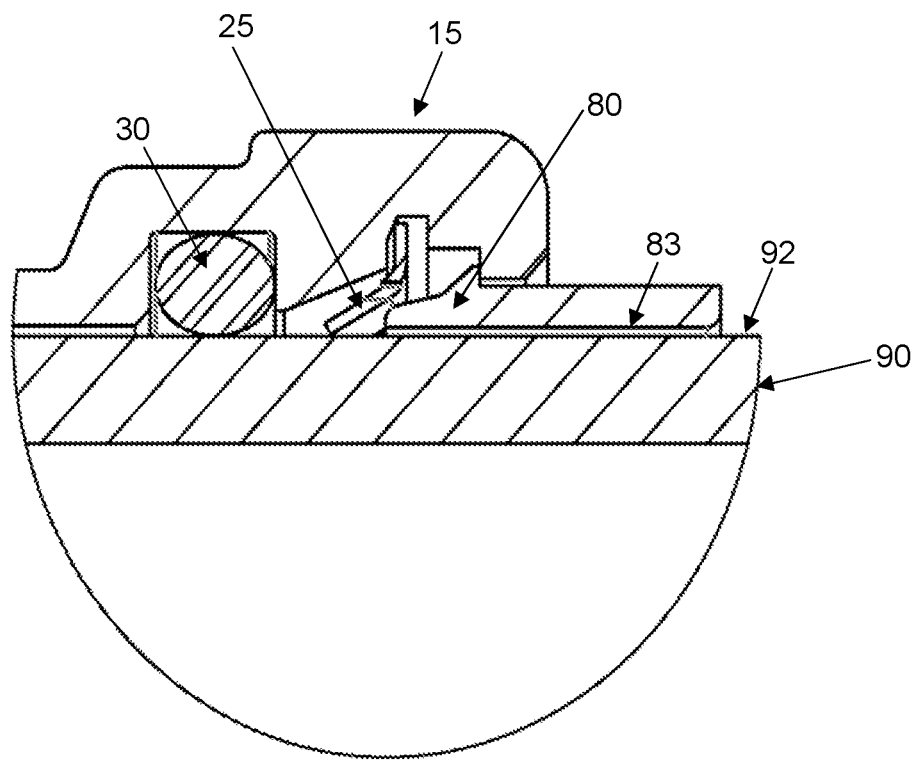
FIG. 18 is an enlarged view of encircled portion 13-13 of FIG. 12.
Figure 19:
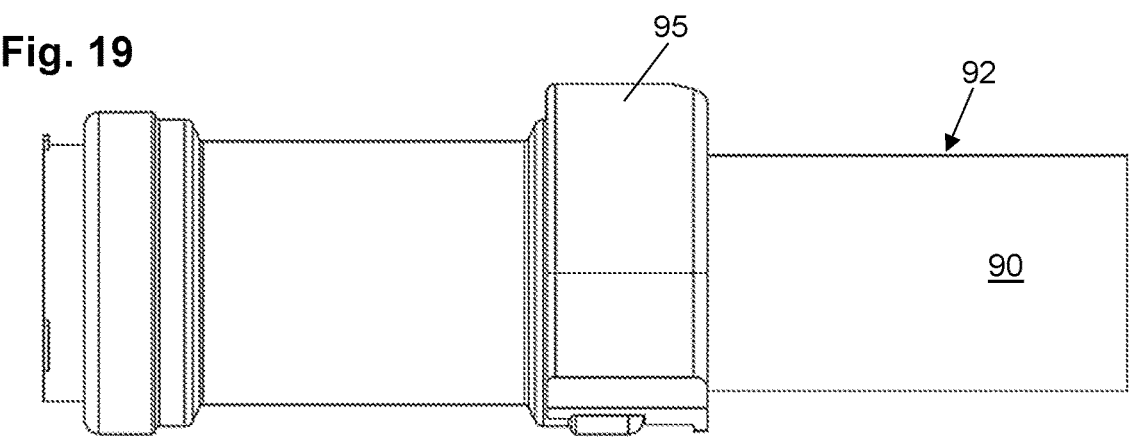
FIG. 19 is a front view of an electrical conduit fitting assembly and further showing a conduit inserted and a release tool applied to the fitting in accordance with embodiments of the present disclosure.
Figure 20:
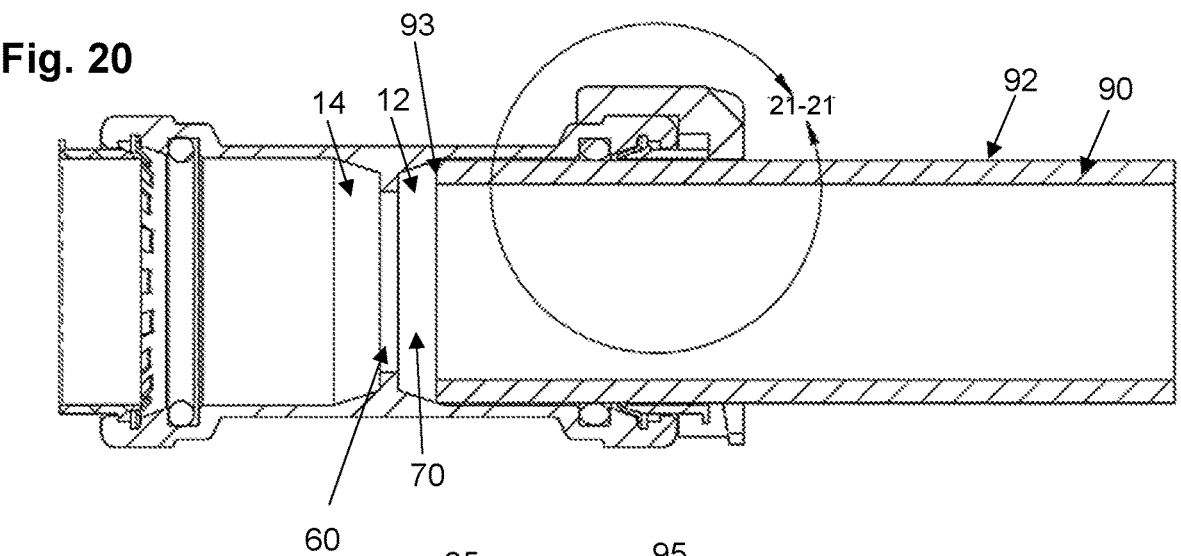
FIG. 20 is a cross-sectional view of the arrangement of FIG. 19.
Figure 21:
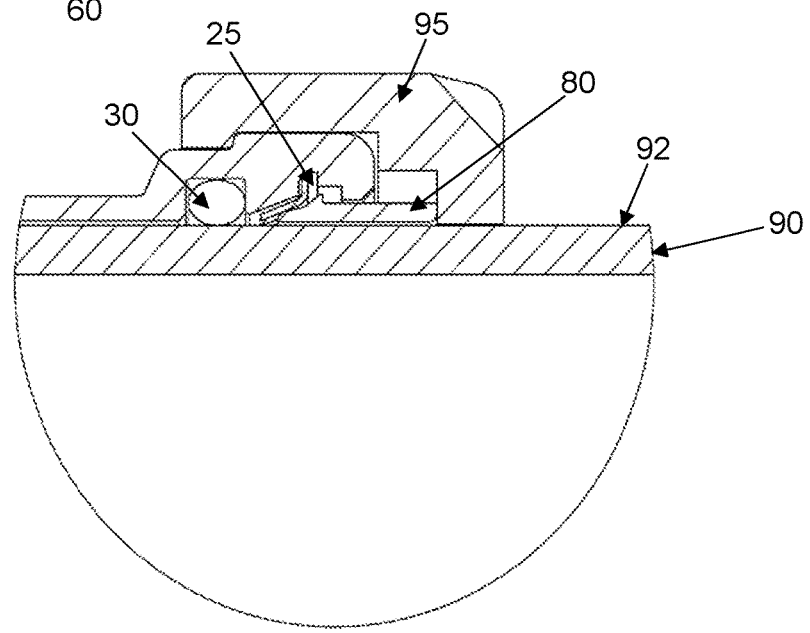
FIG. 21 is an enlarged view of encircled portion 21-21 of FIG. 20.

The tapered internal surface 71 of the axially inner portion 70 of the fitting 15 provides an effective stopping surface for inserted tubes and pipes, regardless of diameter and regardless of whether the leading end of the inserted tube is finished with a thread or as a plain surface (i.e., unthreaded). In operation, the pipe or tubing 90 makes continual contact with the internal surface 71 and may be slightly compressed upon reaching the tube stop 60 or a stopping point that is axially away from the tube stop 60. For instance, as shown in FIGS. 17 and 20, the inserted piping element 90 does not reach the tube stop 60; however, the present device as shown therein maintains a strong, leak-proof and smooth connection of components that accommodates conduit of different sizes, diameters and finishes. It will be appreciated that sufficient retentive force is provided by the device and assembly as described herein regardless of the axial location on the axially inner portion 70 of the internal surface 20 of the fitting 15. For example, a narrower piping element may reach the tube stop 60, whereas wider piping elements may reach a stopping point that is thirty percent, fifty percent, eighty percent, etc. down the face of the axially inner portion 70 toward the first axially intermediate portion 80 of the interior surface 20 of the fitting 15.

As shown in FIGS. 3, 6 through 11 and 17 through 21, a fastening ring 25 is maintained within the fourth axially intermediate portion (e.g., 130) of the interior surface 20 of one or both segments 12, 14 of the fitting, depending upon the embodiment. The fastening ring 25 can be formed as a unitary, monolithic member with a fastening ring base 26 and teeth 27 extending radially inwardly therefrom. The fastening ring 25 can be provided as an integral, unsplit ring (see FIG. 9) or can be a split ring member (see FIG. 6). In the embodiments where the fastening ring 25 is a split ring, the fastening ring 25 can include two circumferential end points (not shown) that do not connect, with fixture points for handling and compressing the fastening ring, such that a tool designed to hold the fastening ring at the fixture points can more easily handle and compress the fastening ring in order to assist with assembly or disassembly of embodiments disclosed herein. In this embodiment, and once compressed, the fastening ring 25 is easily insertable into the fitting 15 by releasing the hold on the fixture points, thereby allowing the fastening ring to expand such that the circumferential base engages the interior surface 20 within the fourth axially intermediate portion 130. The fastening ring can be removed from the second radial housing element in similar manner. No wrenches, solder, welding, glue and/or twisting and turning the elements are required to form or disengage a connection.

The fastening ring 25 can comprise a spring steel formulation, for example, that enables the fastening ring to be malformed during installation, while springing back into its originally manufactured position once installed. The fastening ring is capable of grabbing an inserted pipe's surface via two or more teeth 27 to ensure connections cannot be pulled apart. The fastening ring teeth 27 can be angled downwardly from the substantially cylindrical perimeter of the ring base 26, toward the third axially intermediate portion 120 and/or 220, such that when a pipe is inserted, the teeth 27 exert a pressure against the pipe to discourage the pipe from slipping or moving back out of the fitting. Within the fitting, the teeth 27 extend axially and radially inwardly from a position within the fourth axially intermediate portion 130 and/or 230 to a position within the third axially intermediate portion 120 and/or 220. In various embodiments, during operation, the teeth are flexed axially inwardly and may be supported by the angled third axially intermediate portion 120 and/or 220.

In embodiments of the fastening ring 25 according to the present disclosure and as shown in FIGS. 6 through 11, the fastening ring 25 may be provided with one or more teeth (e.g., 27A) having a first length L1 from the base 26 and one or more teeth (e.g., 27B) having a second length L2 from the base 26, wherein length L2 is longer than length L1. The staggered length arrangement assists in accommodating inserted pipes of different types, diameters and finishes. For example, a pipe of a narrower diameter (such as an IMC coupling, for example) may not be as snugly retained by fastening ring teeth 27A having a shorter length but would still be snugly retained by the longer fastening ring teeth 27B. In other words, the fastening ring teeth 27B would provide a greater resisting force to any potential force that might otherwise move an inserted pipe 90 of narrower diameter axially outwardly of the fitting 15 once installed.

Another pipe having a wider diameter (such as an RMC coupling, for example) may be more snugly retained by teeth 27A and may not be as snugly retained by teeth 27B. In other words, the shorter fastening ring teeth 27A would provide a greater resisting force than the longer fastening ring teeth 27B to any potential force that might otherwise move an inserted pipe 90 of wider diameter axially outwardly of the fitting 15 once installed. It will be appreciated that, as between different IMC and RMC conduits of the same commercial size (e.g., three-inch diameter), a threaded IMC conduit may have the smallest true profile diameter, followed by a plain (i.e., unthreaded) IMC conduit, followed by a threaded RMC conduit and then followed by a plain RMC conduit, which would have the largest true profile diameter. In various embodiments, the fastening ring teeth 27 are arranged so as to alternate from one length L1 to a longer length L2 in repeated fashion around the internal circumference of the fastening ring 25, as shown in FIGS. 6 through 11. The teeth 27 of the fastening ring 25 can extend at various angles from the base axis as measured when the teeth are at rest position and are not stressed by the insertion of a pipe, for example. The number of teeth can readily vary in number and size.

Figure 4:
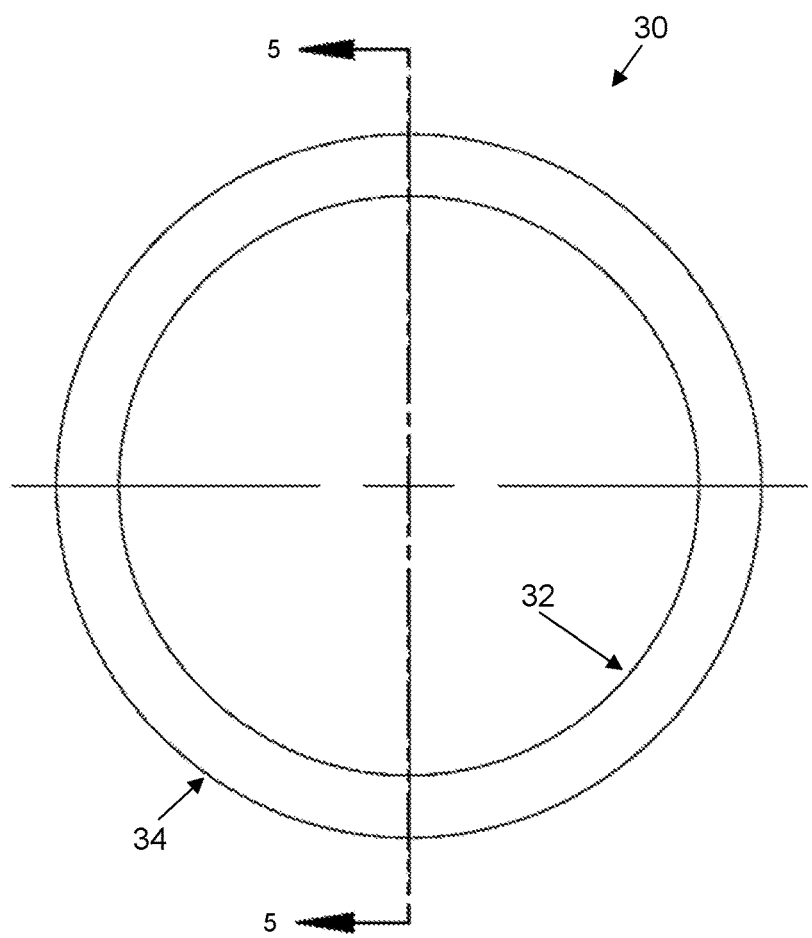
FIG. 4 is a front view of a sealing ring in accordance with embodiments of the present disclosure.
Figure 5:
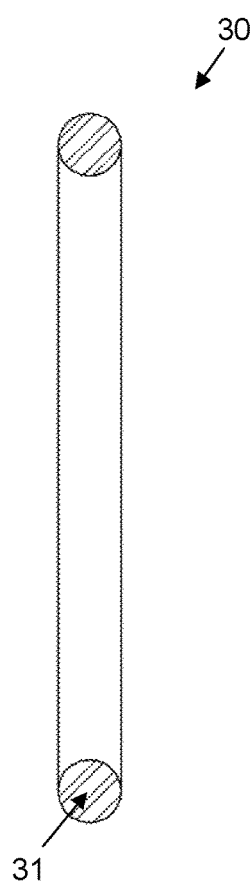
FIG. 5 is a cross-sectional view taken along the line 5-5 of FIG. 4.
Figure 9:
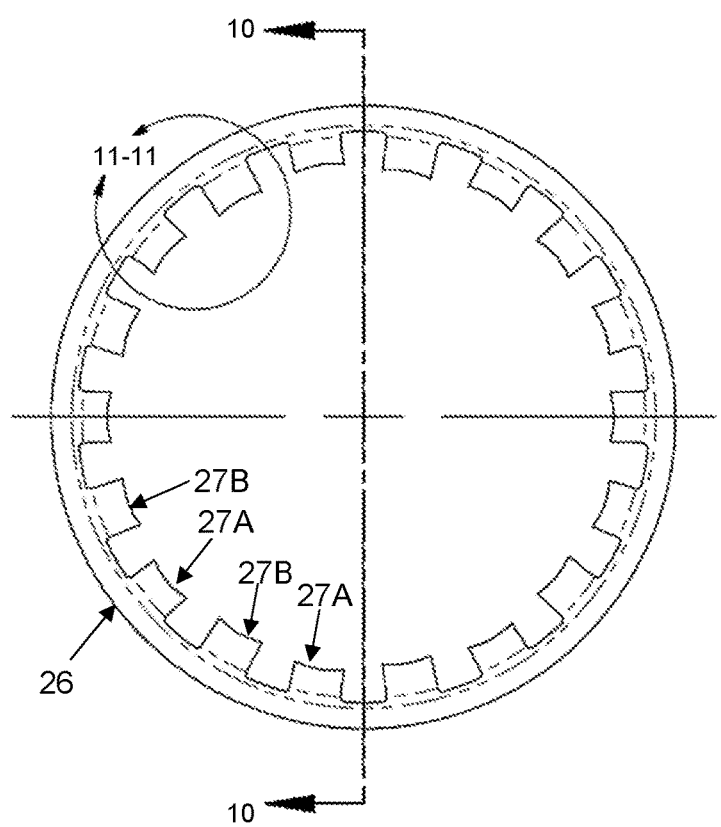
FIG. 9 is a front view of an alternative fastening ring in accordance with embodiments of the present disclosure.
Figure 10:
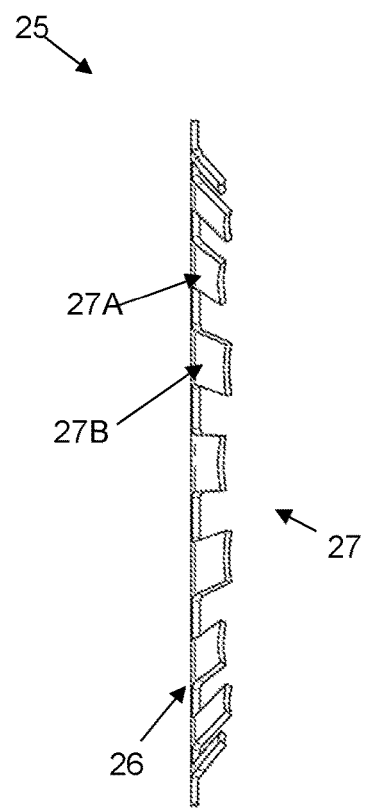
FIG. 10 is a cross-sectional view of the fastening ring taken along line 10-10 of FIG. 9.
Figure 11:
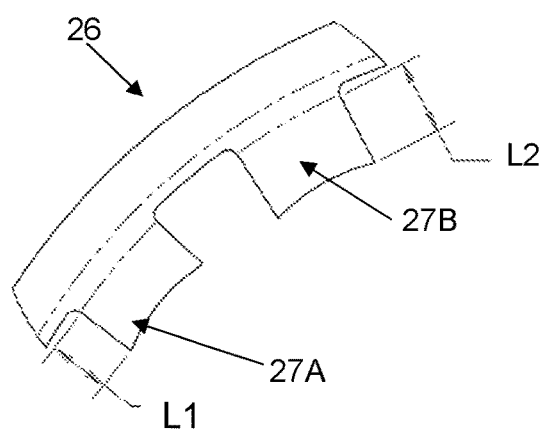
FIG. 11 is an enlarged view of encircled portion 11-11 of FIG. 9.
Figure 12:
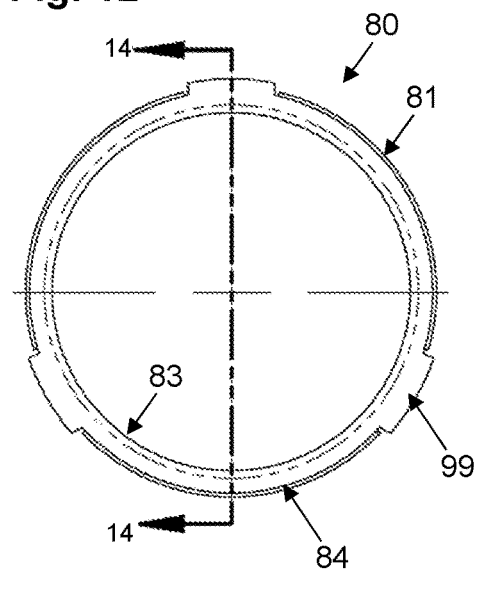
FIG. 12 is a top plan view of a release pusher in accordance with embodiments of the present disclosure.
Figure 13:
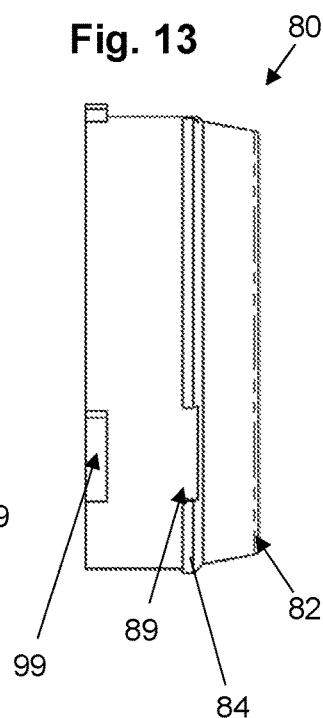
FIG. 13 is a side view of the release pusher of FIG. 12.
Figure 14:
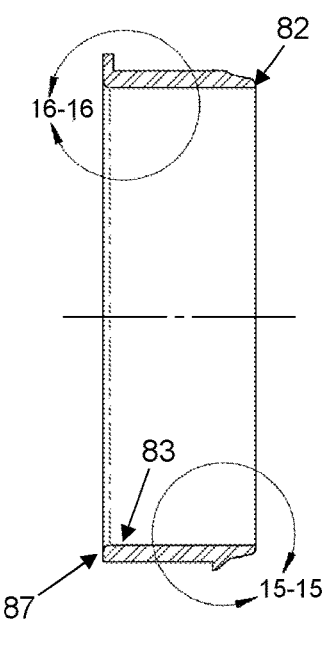
FIG. 14 is a side cross-sectional view of the release pusher taken along the line 14-14 of FIG. 12.
Figure 15:
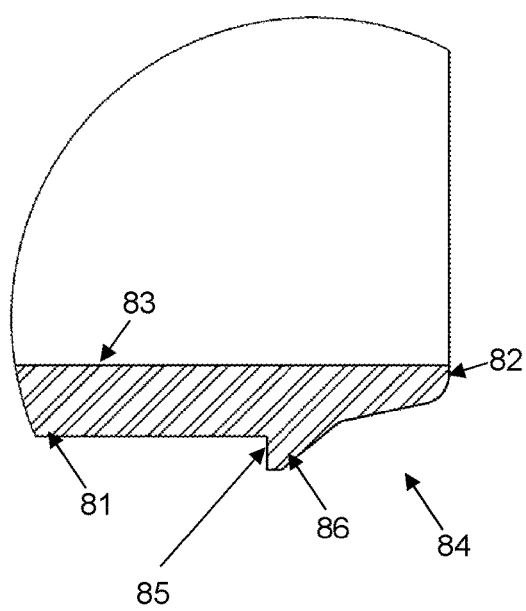
FIG. 15 is an enlarged view of encircled portion 15-15 of FIG. 14.
Figure 16:
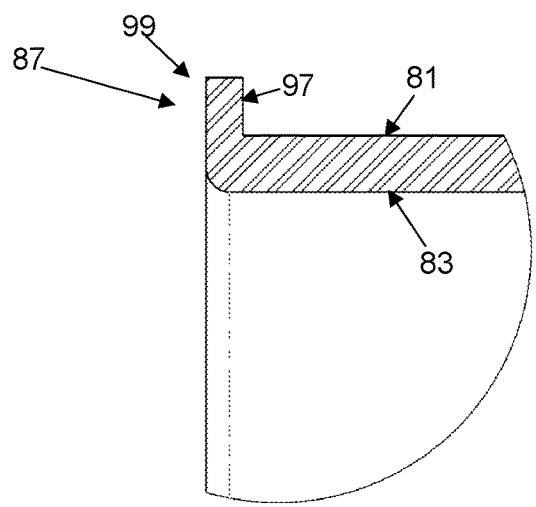
FIG. 16 is an enlarged view of encircled portion 16-16 of FIG. 14.

It will be appreciated that no wrenches, solder, welding, glue and/or twisting and turning the elements are required to form a connection. In various embodiments, the fitting 15 can be forged CW617N brass, with full porting and full flow fitting, for example. As shown in FIGS. 4 and 5, the sealing member 30 can be formed as a ring-shaped body 31 made of rubber and having a circular or substantially circular cross-section, with an external surface 32 and an internal surface 34. The lubricant for the sealing member 30 can be a food grade lubricant, for example. It will be appreciated that the sealing member 30 can comprise a flat ring or washer-type seal member in addition or as an alternative to a circular member of substantially circular cross-section. As shown in FIGS. 3, 17-18 and 20-21, the sealing member 30 is retained within the second axially intermediate portion 110 and/or 210 of the interior surface 20 of the fitting 15. The sealing member acts to assist with the seal of an inserted piping element within the fitting and to prevent fluid from escaping, thus providing a fluid-tight seal of the inserted piping element.

Figure 3:
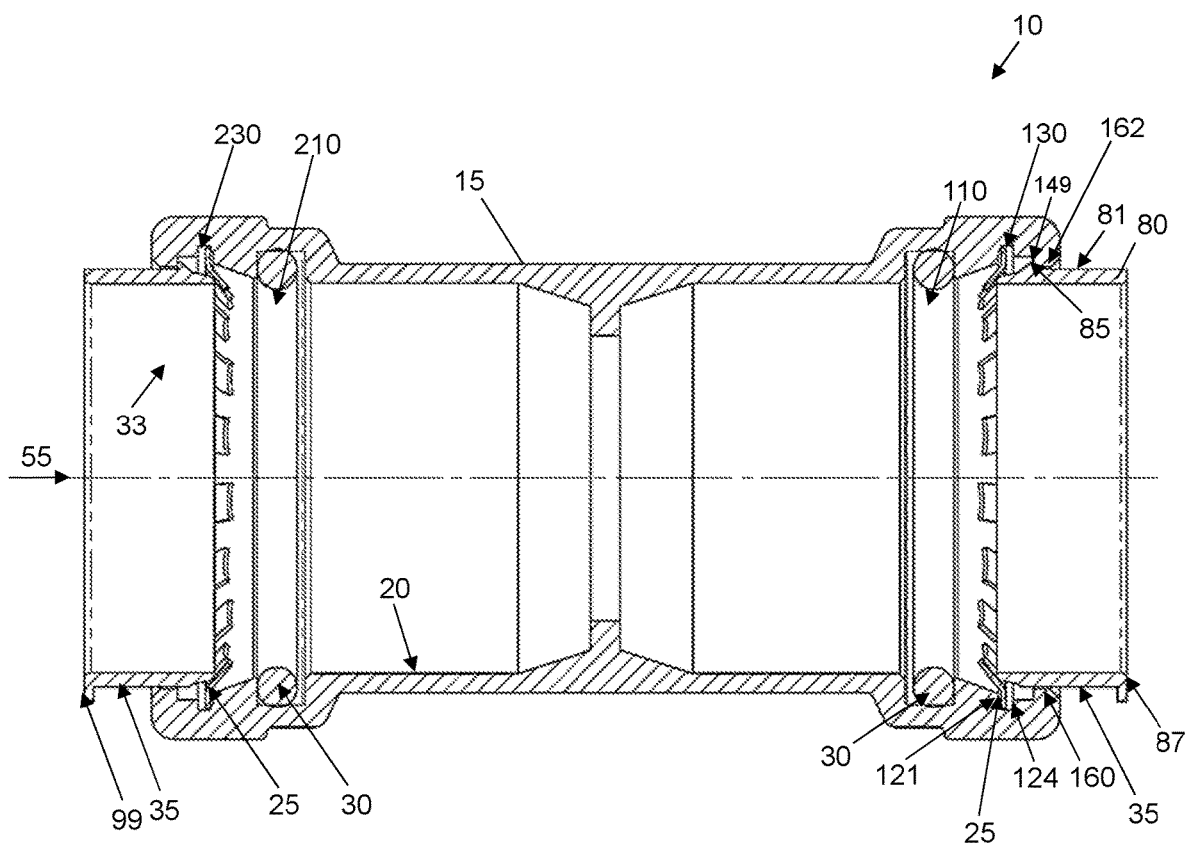
FIG. 3 is a front cross-sectional view of an electrical conduit fitting assembly in accordance with embodiments of the present disclosure.

As shown in FIGS. 1, 3 and 12 through 16, for example, embodiments of the present disclosure employ a release pusher 80 axially slidable against the axially outer portion 160 of the fitting interior surface 20. When the release pusher 80 is pushed axially inwardly, the leading edge 82 of the release pusher 80 lifts the teeth 27 of the fastening ring 25 and thereby facilitates the insertion and release of a cylindrical object such as a piping element 90 to be held within the fitting 10. When a piping element is desired to be removed, axially applied pressure can be provided again to the release pusher 80, lifting the fastening ring teeth 27 off of the inserted pipe 90 to allow it to be removed. In embodiments, the release pusher 80 is maintained within the fitting body 15 and is part of the packing arrangement. In various embodiments, the release pusher 80 is formed with an external surface 81, a substantially cylindrical interior surface 83 and a leading edge 82. The release pusher 80 can also be formed with a radially outer ledge segment 84 having a front wall 86 and a ledge back wall 85. The pusher 80 can comprise an injection-molded plastic or a metal material such as brass, for example. When pressure is applied on the back surface 87 of the release pusher 22, the leading edge 82 can engage the inside surface of the fastening ring teeth 27 and the ledge back wall 85 can removably engage the radially extending axially outer edge 149 of fifth axially intermediate portion 140 of the interior surface 20 of the fitting 15, as shown in FIG. 3. As the release pusher 80 is inserted into the opening 55, the radially outer ledge segment 84 engages the fastening ring teeth 27 and pushes them axially inwardly toward the angled third axially intermediate portion 120.

A tube 90 with a release pusher tool 95 positioned around the circumference of the tube 90 can then be inserted into the opening 55 at an axial end of the fitting body 15, and the tool 95 (or alternatively, manual or similar pressure) can be applied to the back surface 87 of the retaining ring 80, thereby forcing the fastening ring teeth 27 radially outwardly such that the tube 25 can be smoothly inserted until it reaches the tube stop 60 of the fitting 15 or a stopping point along the axially inner portion 70 of the fitting interior surface 20 as described elsewhere herein. At such time, the force on the fastening ring 25 can be released, thereby allowing the fastening ring ledge back wall 85 to rest against the radially extending axially outer edge 149 of fifth axially intermediate portion 140 of the interior 20 of the fitting 15, and allowing the fastening ring teeth 27 to engage the outer surface 92 of the tube 90. A similar installation of another tube can take place at the other axial end corresponding to the second segment 14 of the fitting 15.

In operation, the fitting 15 is formed with the tapered axially inner portion 70 and other portions as described above, and a sealing member 30 is inserted into the second axially intermediate portion 110 of the fitting 15 and retained between the radially extending ledge 84 and the radially inwardly extending support 112. The fastening ring 25 is then inserted such that its base 26 is securely retained within the fourth axially intermediate portion 130 of the interior surface 20 of the fitting 15. For example, the fastening ring base 26 can be maintained between the radially outwardly extending rampart 121, and the radially inwardly extending step 124 as shown in FIG. 3. The release pusher 80 can then be inserted so as to slidingly engage the axially outer portion 160 of the interior surface 20 of the fitting 15 as shown and described elsewhere herein.

In various embodiments, as shown in FIGS. 12 through 16, the outer surface 81 of the release pusher 80 is provided with a radially outer ledge segment 84 and one or more radially outwardly extending flanges 99. The radially outer ledge segment 84 can be formed with one or more notches 89 formed therein, which creates a modest weakness in the ledge segment 84 permitting easier insertion of the release pusher 80 when installed in the fitting 15. The radially outwardly extending flanges 99 can be formed with an axially inner wall 97 extending radially outwardly from the outer surface 81 of the release pusher 80 near the back surface 87 of the release pusher 80. In various embodiments, the flanges 99 are axially aligned with the notches 89 such that the axial force provided against the flanges 99 combined with the weakness created by the notches 89 permits the release pusher 80 to be more easily installed and removed. In operation, and after installed, the release pusher tool 95 can be used to grip the flanges 99 in order to squeeze and/or pull the release pusher axially outwardly of the fitting 15.

When a piping element 90 is inserted, as shown in FIGS. 17 through 21, it slidingly engages the inner surface 83 of the release pusher 80 as it travels into the pipe receiving cavity 55 of the fitting 15, engaging the fastening ring 25 and the sealing member 30. As the piping element 90 is fully inserted (i.e., when the leading edge 93 of the piping element 90 contacts either tube stop 60 or the axially inner portion 70, the teeth 27 of the fastening ring 25 engage the outer surface 92 of the inserted piping element 90 in order to retain the piping element 90 securely within the fitting 15. The sealing member 30 helps to provide a strong, leak-free seal and the combination of the sealing ring 30, the fastening ring 25 and the narrower internal cavity of the axially inner portion 70 of the fitting 15 prohibit any inclination an inserted pipe may have to slide out of position.

The angles, dimensions and materials described herein will be understood to be exemplary and provided as embodiments associated with proper working operation of the device, assembly and method as presently disclosed. Further, it will be appreciated that, in various embodiments, the members of the push connect joint assembly can be formed through hydroforming processes. Additionally, embodiments can be provided whereby the fitting and/or fitting includes independent packing arrangements on both sides of the tube stop 60, where the packing arrangements each comprise at least one of the following: sealing ring, fastening ring and release pusher, for example.

The device, assembly and method as presently disclosed may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting assembly, comprising:
a fitting body comprising an interior surface and an exterior surface, wherein the interior surface defines a cavity extending along an axis through the fitting body, wherein the fitting body further comprises a first segment separated from a second segment by a radially extending tube stop, wherein the first segment comprises an axially inner portion extending axially and radially outwardly from the tube stop, an axially outer portion and first, second, third, fourth and fifth axially intermediate portions, wherein the first axially intermediate portion extends axially outwardly from the axially inner portion to a radially extending ledge, wherein the second axially intermediate portion extends axially outwardly from the radially extending ledge to a radially inwardly extending support, wherein the radially extending support comprises a support edge, wherein the third axially intermediate portion extends axially and radially outwardly from the support edge to a radially outwardly extending rampart, wherein the fourth axially intermediate portion extends axially outwardly from the rampart to a radially inwardly extending step, wherein the fifth axially intermediate portion extends axially outwardly from the radially inwardly extending step to a radially inwardly extending lip, and wherein the axially outer portion of the first segment extends axially outwardly from the radially inwardly extending lip;
a sealing ring maintained within the second axially intermediate portion;
a fastening ring maintained within the fourth axially intermediate portion; and
a release pusher maintained in sliding engagement with the axially outer portion.

2. The fitting assembly of claim 1, wherein the fastening ring comprises fastening ring teeth extending axially and radially inwardly from a position within the fourth axially intermediate portion to a position within the third axially intermediate portion.

3. The fitting assembly of claim 1, wherein the fastening ring comprises a base with a plurality of sets of teeth extending therefrom, wherein a first of the plurality of sets of teeth extend a first length from the base and a second of the plurality of sets of teeth extend a second length from the base, and further wherein the first length is longer than the second length.

4. The fitting assembly of claim 1, wherein the axially outer portion of the first segment comprises an axially inward portion and an axially outward portion, wherein the axially inward portion extends axially outwardly from the radially inwardly extending lip to an axially outer portion edge, and wherein the axially outward portion extends axially and radially outwardly from the axially outer portion edge.

5. The fitting assembly of claim 4, wherein the release pusher is maintained in sliding engagement with the axially inward portion of the axially outer portion of the first segment.

6. The fitting assembly of claim 1, wherein the fastening ring is split.

7. The fitting assembly of claim 1, wherein the axially inner portion extends axially and radially outwardly from the tube stop at a constant angle.

8. The fitting assembly of claim 1, wherein the tube stop comprises a radially innermost and axially extending wall and a first segment radially extending wall, wherein the first segment radially extending wall comprises a first segment edge, wherein the edge lies radially outwardly of the axially extending wall, and wherein the axially inner portion extends axially and radially outwardly from the first segment edge.

9. The fitting assembly of claim 1, wherein the axially inner portion extends axially and radially outwardly from a first segment edge at a constant angle to the first axially intermediate portion.

10. A fitting, comprising:
a fitting body comprising an interior surface and an exterior surface, wherein the interior surface defines a cavity extending along an axis through the fitting body, wherein the fitting body further comprises a first segment separated from a second segment by a radially extending tube stop, wherein the first segment comprises an axially inner portion extending axially and radially outwardly from the tube stop, an axially outer portion and first, second, third, fourth and fifth axially intermediate portions, wherein the first axially intermediate portion extends axially outwardly from the axially inner portion to a radially extending ledge, wherein the second axially intermediate portion extends axially outwardly from the radially extending ledge to a radially inwardly extending support, wherein the radially extending support comprises a support edge, wherein the third axially intermediate portion extends axially and radially outwardly from the support edge to a radially outwardly extending rampart, wherein the fourth axially intermediate portion extends axially outwardly from the rampart to a radially inwardly extending step, wherein the fifth axially intermediate portion extending axially outwardly from the radially inwardly extending step to a radially inwardly extending lip, and wherein the axially outer portion of the first segment extends axially outwardly from the radially inwardly extending lip.

11. The fitting of claim 10, wherein the axially outer portion of the first segment comprises an axially inward portion and an axially outward portion, wherein the axially inward portion extends axially outwardly from the radially inwardly extending lip to an axially outer portion edge, and wherein the axially outward portion extends axially and radially outwardly from the axially outer portion edge.

12. The fitting of claim 10, wherein the axially inner portion extends axially and radially outwardly from the tube stop at a constant angle.

13. The fitting of claim 10, wherein the tube stop comprises a radially innermost and axially extending wall and a first segment radially extending wall, wherein the first segment radially extending wall comprises a first segment edge, wherein the edge lies radially outwardly of the axially extending wall, and wherein the axially inner portion extends axially and radially outwardly from the first segment edge.

14. The fitting of claim 10, wherein the axially inner portion extends axially and radially outwardly from a first segment edge at a constant angle to the first axially intermediate portion.

15. A fitting, comprising:
a fitting body comprising an interior surface and an exterior surface, wherein the interior surface defines a cavity extending along an axis through the fitting body, wherein the fitting body further comprises a first segment separated from a second segment by a radially extending tube stop, wherein each of the first and second segments comprises a respective axially inner portion extending axially and radially outwardly from the tube stop, a respective axially outer portion and respective first, second, third and fourth axially intermediate portions, wherein each respective first axially intermediate portion extends axially outwardly from the respective axially inner portion to a respective radially extending ledge, wherein each respective second axially intermediate portion extends axially outwardly from the respective radially extending ledge to a respective radially inwardly extending support, wherein each respective radially extending support comprises a respective support edge, wherein each respective third axially intermediate portion extends axially and radially outwardly from the respective support edge to a respective radially outwardly extending rampart, and wherein each respective fourth axially intermediate portion extends axially outwardly from the respective rampart to a respective radially inwardly extending step;
wherein the tube stop comprises a radially innermost and axially extending wall, a first segment radially extending wall and a second segment radially extending wall, wherein the first segment radially extending wall comprises a first segment edge, wherein the second segment radially extending wall comprises a second segment edge, wherein the first segment edge and the second segment edge lie radially outwardly of the axially extending wall, wherein the axially inner portion of the first segment extends axially and radially outwardly from the first segment edge and wherein the axially inner portion of the second segment extends axially and radially outwardly from the second segment edge.

16. The fitting of claim 15, wherein the axially inner portion of the first segment extends axially and radially outwardly from the first segment edge at a constant angle to the first axially intermediate portion, and wherein the axially inner portion of the second segment extends axially and radially outwardly from the second segment edge at a constant angle to the second axially intermediate portion.

* * * * *